United States Patent Office 3,272,453
Patented Sept. 13, 1966

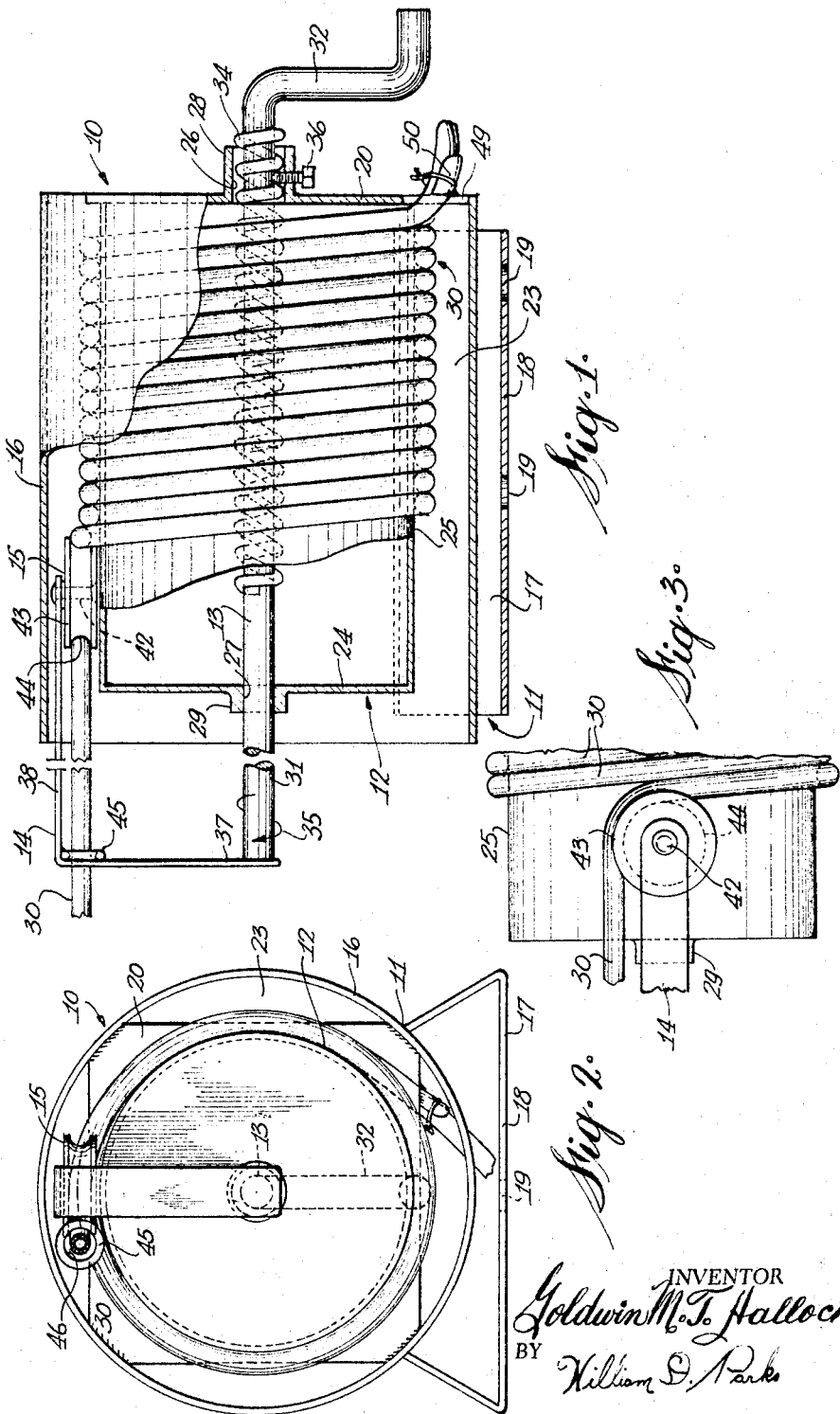

3,272,453
LINE STORAGE REEL
Goldwin M. T. Hallock, Box 276, Fenelon Falls,
Ontario, Canada
Filed Feb. 24, 1965, Ser. No. 434,846
Claims priority, application Canada, Jan. 21, 1965,
921,310
11 Claims. (Cl. 242—86)

This invention relates to a line storage device, and more particularly, to a device which is capable of recoiling a long length of hose connected at one end to a stationary pump, valve, or similar supply means.

On marine docks, fuel hoses ranging in length from 50 feet to 400 feet are commonly used. In some instances, means are not provided with the fuel pump on the dock for recoiling such a length of hose, and as a result, the hoses are left in a very disorderly condition on the docks. In other instances, hose winding devices of the known types which utilize a revolving storage drum are provided. However, with these types of known devices, the hose on the drum is rotated with respect to the stationary pump so that it is necessary to utilize packing glands at some point between the pump and the hose on the drum to permit the relative movement between the stationary supply line of the pump and the rotating hose. Such packing glands develop leaks during use, and leakage of fuel presents, of course, a fire hazard on the dock.

It is an object of the present invention to provide a hose storage device of a simple construction which avoids the use of a packing gland.

According to the device of the present invention, there is provided a stationary drum member having a hose receiving outer surface with a shaft mounted for rotation coaxially within the drum member, the shaft having a portion extending outwardly beyond one end of the drum member. Means are provided for shifting the shaft in an axial direction upon rotation of the shaft. A hose carrier arm is fixed to the portion of the shaft extending beyond the end of the drum member, the arm having a portion extending over the outer surface of the drum member, and a hose guide member is carried by the portion of the arm juxtaposed to the surface. The guide member has an arcuate hose engaging surface for directing the hose to a substantially tangential line with respect to the surface of the drum so that the hose is fed spirally into the surface of the drum on rotation of the shaft.

Preferably the guide member comprises a wheel mounted on the arm for rotation about an axis substantially radial to the shaft, the wheel having a hose engaging grooved peripheral surface.

In a specific embodiment of the present invention, the means for axially shifting the shaft consists of a screw thread on the shaft meshing with a stationary thread engaging member, the thread preferably having a pitch equal to the hose thickness.

In the drawings which show an embodiment of the present invention, by way of example:

FIGURE 1 is a side view of the device partially broken away for the sake of clarity;

FIGURE 2 is an end view of the device, as viewed from the left of FIGURE 1; and

FIGURE 3 is a partial view of the guide member as seen from above in FIGURES 1 and 2.

The reference character 10 denotes generally the line or hose winding device of the present invention in FIGURES 1 and 2. The device 10 includes, in the main, a stationary frame 11, a stationary drum member 12 fixed to one end of the frame 11, a shaft 13 mounted for rotation coaxially within the drum member 12, a line carrier arm 14 fixed to shaft 13, and a line guide means 15 carried by the arm 14.

The frame 11 consists of a cylindrically shaped housing 16 and a base 17 fixed thereto by welding or other appropriate means. The base has a flat bottom portion 18 for mounting the device on a flat surface, the bottom portion 18 having bolt receiving apertures 19, 19 so that the device may be fixed to the flat surface. As shown at the left end of the device in FIGURE 1, the housing 16 is completely open at one end and is at least partially closed at the other end by an end plate 20 which is formed integrally with or welded to housing 16.

The drum member 12 is of smaller diameter than housing 16 and is fixed coaxially inside of housing 16 so that an annular hose storage space 23 is defined therebetween. The drum member 12 is fixed to the end plate 20 so that plate member 20 forms a common end member for both the housing 16 and drum member 12 and fixes the drum member 12 to the frame 11. The opposite free end of the drum member 12 adjacent the open end of the housing 16 is closed by an end plate 24. Between its opposite ends, the drum member 12 defines a hose receiving outer surface 25 of cylindrical configuration upon which hose 30 is coiled.

The end plates 20 and 24 have aligned central circular openings 26 and 27 with bosses 28 and 29, respectively, providing bearings rotatably receiving shaft 13. The shaft 13 has a portion 31 extending axially from the free end of drum member 12, and the arm 14 is fixed to the outer end of portion 31. The other end of the shaft 13 extends axially from end plate 20 and is bent to form a hand crank 32. Beginning adjacent crank 32 and extending along the shaft 13 for a distance nearly equal to the length of the surface 25 is a thread 34 (see FIGURE 1). The thread 34 has a pitch equal to the hose thickness, namely the outside diameter of the hose 30. Screwed into an opening in boss 28 is a thread engaging bolt 36, the inner end of which meshes with the thread 34 so that rotation of shaft 13 causes the shaft to be shifted in an axial direction. As an alternative to bolt 36, the boss could be internally threaded or provided with a stationary lug for meshing with thread 34.

Accordingly, as the shaft 13 is cranked in the direction of arrow 35 in FIGURE 1, i.e., in a counter-clockwise direction, as viewed in FIGURE 2, the shaft is axially shifted to project further from the free end of the drum member 12, and as the shaft 13 is cranked in the opposite direction, the portion 31 of the shaft is retracted into the drum member 12, i.e., from left to right as viewed in FIGURE 1.

The arm 14 is L-shaped, having a first radially extending portion 37 and a second axially extending portion 38 integral with the portion 37 and extending into space 23 seubstantially parallel to and spaced radially from surface 25. Thus, as shaft 13 is rotated, the free end of portion 38 is revolved about surface 25. At the free end of portion 38, the arm 14 carries the line guide means 15 which includes a pin 42 and wheel 43. The pin 42 forming the axle about which wheel 43 rotates extends substantially radially with respect to shaft 13. The wheel 43, which is carried adjacent surface 25 between portion 38 and surface 25, has a hose engaging peripheral surface defining a groove 44 to partially receive the hose 30, the groove 44 having a cross-sectional shape substantially the same as a portion of the outer circumference of the hose. The outer end of the radial portion 37 of the arm is provided with an eye member 45 which defines an opening 46, through which the free end of the hose 30 passes. The eye member 45 extends from the forward side of the arm in the direction of arm rotation for hose winding, and the opening 46 is aligned with the groove 44 in the surface of the wheel 43 at the forwardmost side thereof in the direction of rotation for hose winding.

The end plate 20 not being circular, as can best be seen in FIGURE 2, provides an opening 49 in the housing adjacent surface 25, through which extends the stationary end of the hose 30 connected to a pump or similarly stationary means. At the point where the stationary end of the hose 30 enters the housing 16, it is preferably held relative to housing 16 by a clamp 50.

In operation, as the shaft is cranked in a counterclockwise direction as viewed in FIGURE 2, the wheel 43 is carried about the surface 25 on a spiral hose winding path, from right to left as viewed in FIGURE 1. If the hose has been completely unreeled, the wheel 43 starts its spiral path at a point near the fixed end of the drum member 12, or if the hose has been only partially unreeled, the wheel 43 starts at a point a distance from the fixed end of the drum member dependent on the hose still coiled on surface 25. As the wheel 43 is carried about the spiral path during the hose winding rotation of shaft 13, the hose is carried about the drum member 12 by arm 14 and the hose is coiled onto surface 25. The hose passing through opening 46 is guided in an axial direction onto the forward side of the wheel and is directed by its engagement with the curvature of the periphery of the wheel through a bend of approximately 90° to nearly a tangential lie with respect to surface 25. In view of the fact the pitch of the thread 34 is equal to the outer diameter of the hose, the axial advance of the wheel 43 per revolution of arm 14 about the drum member 12 is equal to the width of a coil of the hose on the surface 25 so that each coil is laid into snug engagement with the previous coil. The engagement of the hose leaving the wheel with the adjacent coil maintains the hose in engagement with the wheel 43 for an arc subtended by an angle of approximately 90° and assures even distribution of the hose on surface 25 as is best illustrated in FIGURE 3.

In the simple embodiment shown in the drawings, the hand crank 32 moves inwardly towards the end plate 20 as the hose is reeled into storage, and the shaft 13 is preferably designed so that the hand crank 32 is close to the end of the housing when the hose winding is completed.

The hose can be simply pulled from the device 10, the unreeling hose travelling back around the wheel 43 and out through opening 46 so that the arm is pulled by the unreeling hose in a clockwise direction about the drum member 12 as viewed in FIGURE 2. This rotation of the arm rotates shaft 13, of course, so that the shaft 13, arm 14 and wheel 43 are axially shifted from left to right as viewed in FIGURE 1 at a rate equal to the uncoiling of the hose from surface 25.

From the above, it can be readily seen that the device of the present invention is of simple design, and since the hose is wound on a stationary drum member, the stationary end of the hose can be fastened directly to a pump without the use of a packing gland. The device 10 can obviously be utilized for storage of lines of types other than a hose, where it is desirable to have one end connected to stationary means. For example, it is sometimes desirable to store a length of electrical transmission conductors which may be connected to a stationary power supply at one end and a movable load at the other end. The device of the present invention can very aptly perform this function without the use of electrical brushes or similar means.

In installations where exceptionally heavy lines are used or where it is desirable to provide a rapid winding operation, it is possible, of course, to utilize drive means other than the hand crank 32, such as an electric motor connected through appropriate drive means to shaft 13.

While the invention has been shown and described herein in considerable detail, it would be understood by those skilled in the art that various modifications may be made therein without departing from the spirit of the invention, reference being had to the dependent claims for a definition of the limits of the invention.

I claim:

1. A line storage device comprising a stationary drum member having a line receiving outer surface, a shaft mounted for rotation coaxially within said drum member, said shaft having a portion extending outwardly beyond one end of the drum member, means for axially shifting said shaft upon rotation of said shaft, a line carrier arm fixed to said end portion of said shaft and having a portion extending over said outer surface of said drum member, and a line guide means carried by said portion of said arm juxtaposed said surface and having a curved line engaging surface for directing the line to a substantially tangential line with respect to said surface of the drum, whereby the line is fed spirally onto said surface of the drum on rotation of said shaft.

2. A device as defined in claim 1, wherein said line guide means comprises a wheel mounted on said arm for rotation about an axis extending substantially radially to said shaft, said wheel having a line engaging grooved peripheral surface.

3. A line storage device comprising a stationary drum member having a line receiving outer surface of cylindrical configuration, a shaft rotatably mounted coaxially within said drum member and extending axially outward beyond one end of the drum member, a line carrier arm having a first radially extending portion fixed to said shaft axially outward from said one end of the drum member and a second portion parallel to said shaft and fixed to the outer end of said first portion, said second portion having a free end spaced radially outward from said surface, a line guiding wheel mounted on said arm between said free end and said surface for rotation about an axis extending substantially radially with respect to said shaft, said wheel having a line engaging grooved peripheral surface, and means for axially shifting said shaft during rotation of said shaft in a direction for line winding, whereby said wheel is carried along a spiral path about said surface of said drum member for coiling said line on said surface of said drum member.

4. A device as defined in claim 3, wherein the shaft shifting means comprises a screw thread on said shaft and a thread engaging stationary member meshing with said thread.

5. A device as defined in claim 4, wherein said thread has a pitch equal to the line thickness, whereby said wheel is axially advanced a distance equal to the line thickness per revolution of said wheel about said drum member.

6. A device as defined in claim 3, wherein said first portion of said arm is provided with a line guiding opening substantially aligned with the forwardmost side of the grooved peripheral surface of the wheel in the direction of line winding rotation, whereby said line is directed onto said wheel in an axial direction with respect to said drum member.

7. A device as defined in claim 3, further comprising a cylindrically shaped housing coaxially surrounding said drum member, said housing being open ended at said one end of said drum member, said drum member and said housing defining an annular line storage space therebetween, said second portion of said arm carrying said wheel being rotatably received in said space.

8. A line storage device comprising a stationary frame, a drum member having one free end and being fixed at the other end thereof to said frame, said drum member having a line receiving outer surface of cylindrical configuration between said ends, a shaft journalled coaxially within said drum member and having one end projecting axially outward beyond said one end of said drum member, drive means on the other end of said shaft for rotating said shaft, said shaft having a screw thread therealong of a pitch equal to the line thickness, stationary thread engaging means for axially shifting said shaft in a direction from the fixed end of said drum member towards the free end upon rotation of said shaft in a line winding direction and for axially shifting said shaft in the opposite direction upon rotation of said shaft in a line unwinding direction, a line carrier arm fixed to the projecting end of the shaft for rotation therewith, said arm having a radially extending portion integral with a second axially extending portion parallel to and spaced radially outward from said line receiving surface, a line guiding wheel mounted on said second portion of said arm juxtaposed to said line receiving surface for rotation about an axis extending radially with respect to said shaft, said wheel having a line engaging grooved peripheral surface, means on said first portion of said arm defining a line guiding opening aligned with the forwardmost side of the grooved peripheral surface of the wheel in the direction of line winding rotation, whereby said line is directed onto said wheel in an axial direction with respect to said drum member and then bent approximately through 90° by said wheel into a spiral coil about said line receiving surface upon rotation of said shaft in a line winding direction.

9. A device as defined in claim 8, wherein said frame includes a cylindrical shaped housing coaxially surrounding said drum member, said housing being open ended at said one end of said drum member and being spaced radially outward from said second portion of said arm to define an annular line storage space about said line receiving surface.

10. A device as defined in claim 9, wherein said housing is closed by an end plate at said other end of said drum member, said end plate having an opening adjacent said line receiving surface to provide a passageway into said housing for a stationary end of said line.

11. A device as defined in claim 9, wherein said shaft has a portion extending axially out of said housing at said other end of said drum member, the extending portion of said shaft having a hand crank formed thereon to permit manual rotation of said shaft.

References Cited by the Examiner
UNITED STATES PATENTS

| 2,595,655 | 5/1952 | Hannay | 242—86 |
| 2,624,119 | 1/1953 | Magnuson | 242—158.2 X |
| 2,702,674 | 2/1955 | Willson et al. | 242—86 |

FRANK J. COHEN, *Primary Examiner.*

N. L. MINTZ, *Assistant Examiner.*